Jan. 30, 1940.　　　A. CLAUD-MANTLE　　　2,188,334
LATCH, SAFETY CATCH, AND LIFTING MECHANISM FOR LID TYPE AUTOMOBILE HOODS
Filed Oct. 17, 1938　　　2 Sheets-Sheet 1
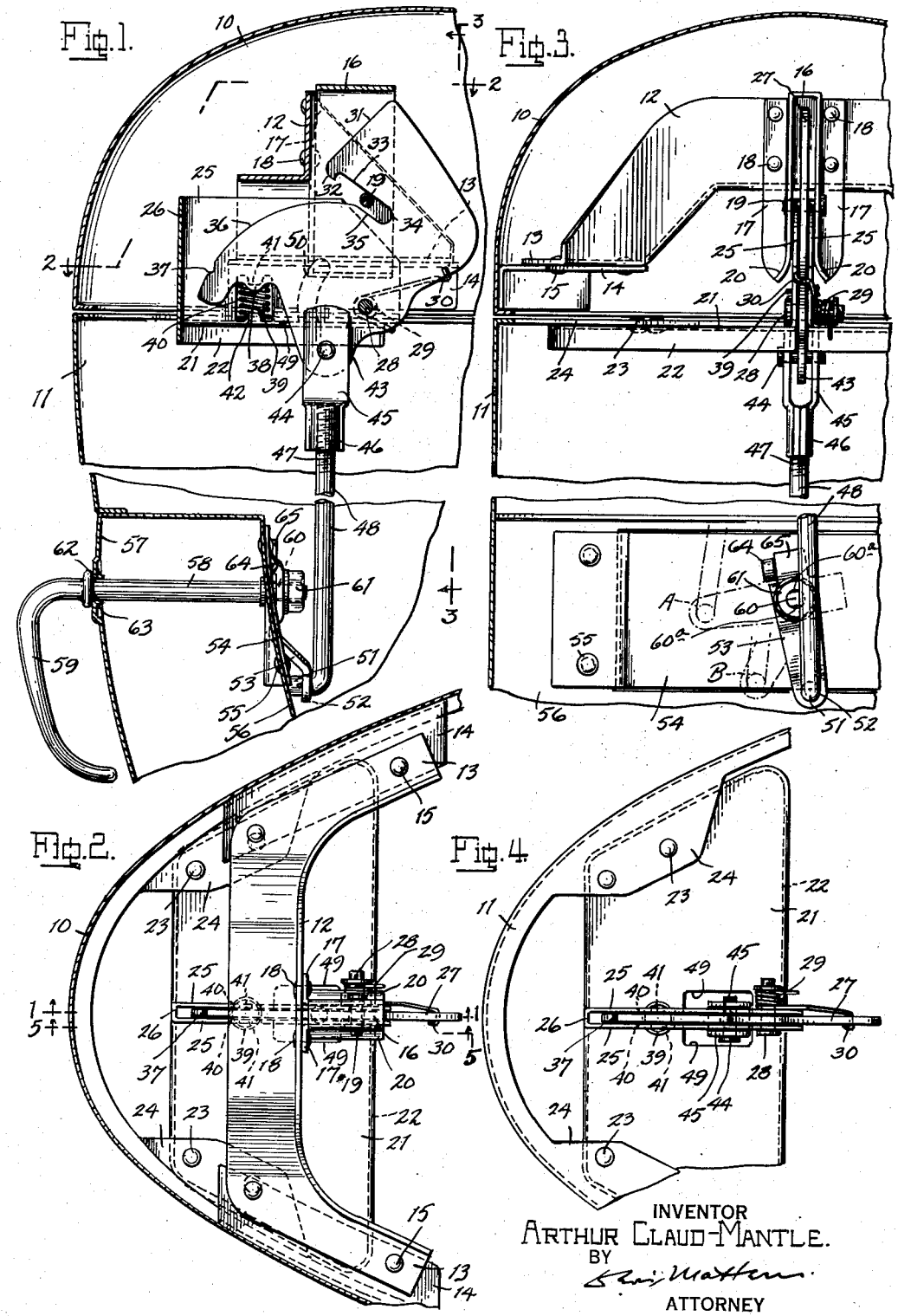
INVENTOR
ARTHUR CLAUD-MANTLE.
BY
ATTORNEY Jan. 30, 1940.  A. CLAUD-MANTLE  2,188,334
LATCH, SAFETY CATCH, AND LIFTING MECHANISM FOR LID TYPE AUTOMOBILE HOODS
Filed Oct. 17, 1938  2 Sheets-Sheet 2
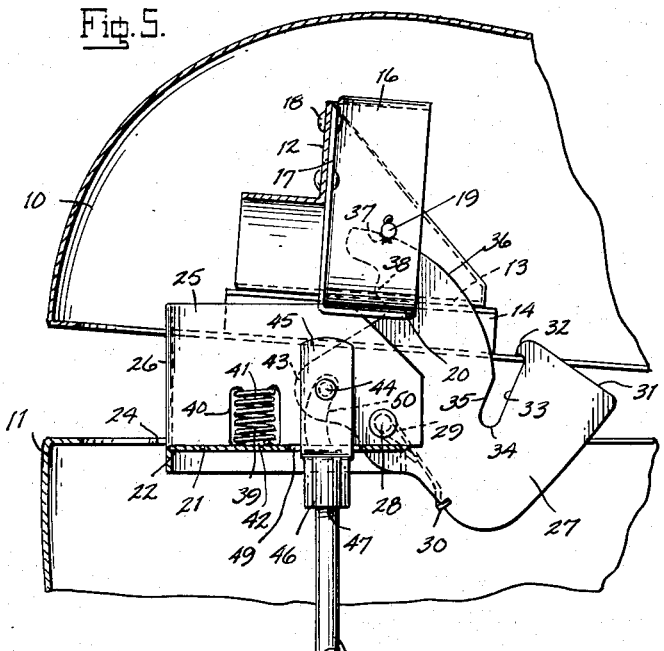
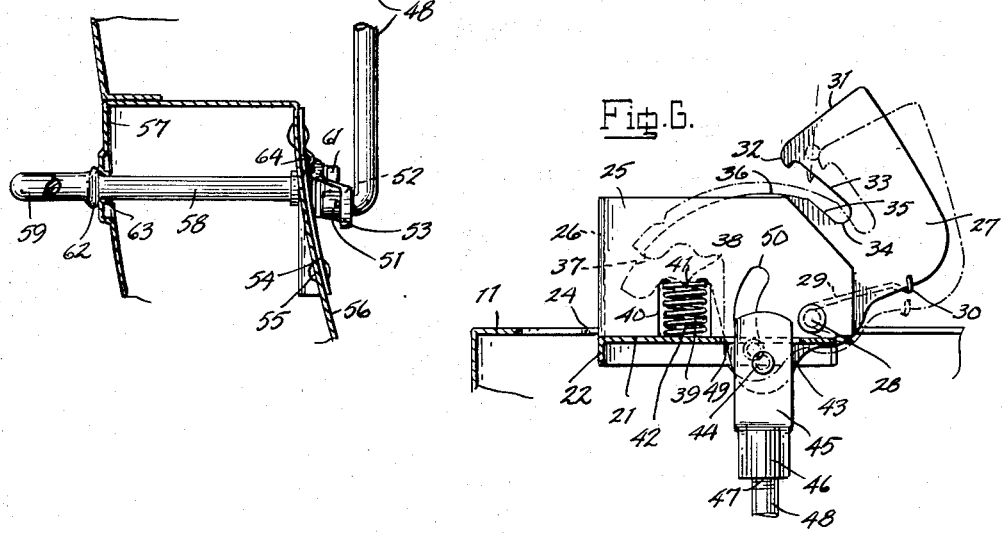
INVENTOR
ARTHUR CLAUD-MANTLE
BY
ATTORNEY Patented Jan. 30, 1940

2,188,334

UNITED STATES PATENT OFFICE 2,188,334

LATCH, SAFETY CATCH, AND LIFTING MECHANISM FOR LID TYPE AUTOMOBILE HOODS

Arthur Claud-Mantle, Trumbull, Conn., assignor to The Bassick Company, Bridgeport, Conn., a corporation of Connecticut Application October 17, 1938, Serial No. 235,368

11 Claims. (Cl. 292—223)

The present invention relates to an improvement in latch, safety catch and lifting mechanism for lid type automobile hoods, particularly of the alligator type which are hinged to the cowl at the rear of the engine compartment, the forward end of the hood adapted to be swung upwardly in the open position. Because of the arrangement of the forward swinging end of the hood, where air currents produced during forward travel of the automobile tend exert of force to open the hood, it is especially desirable that the latch mechanism be so connected at all times in the closed position of the hood that there will be no possibility of the hood accidentally raising, as such accidental and unexpected raising of the hood will obstruct the vision of the driver and is apt to result in serious accident. It is an object of the invention to provide in a latch mechanism a safety catch means whereby the hood is restrained from accidental opening in its closed position, irrespective of whether or not the latch mechanism has been manually actuated to its normal latching position.

Another object is to provide a latch mechanism in which resilient means is employed for automatically returning the latch parts, after the hood has been opened, to such position that they will automatically engage the cooperating parts on the hood when the latter is closed, and will thereupon assume a safety catch position to prevent accidental opening of the hood.

Another object is to provide a latch mechanism including centralizing means adapted to insure the proper centralizing engagement of the hood in its closed position. A further object is to provide a remote actuating means for the latch mechanism in which the latch handle will be disposed in an inconspicuous and conveniently accessible position, and particularly it is proposed to provide such actuating handle at the lower end of the radiator grill. Another object is to provide latch mechanism which will occupy a relatively small space, where such mechanism will not interfere with the operating parts of the automobile, and further to provide mounting means for the latch mechanism which will form a structural reinforcing structure for the forward end of the engine compartment and hood.

Another object is to provide a latch mechanism in which the hook member is in the form of a cam plate having surfaces constituting cam locking means, safety catch means and guide means, and further to provide such cam member having a cam surface adapted during its actuation to unlatching position to impart initial raising movement to the hood, and further having means adapted to support the hood in such initially raised position preparatory to its being manually raised to full open position.

With the above and other objects in view, an embodiment of the invention is shown in the accompanying drawings, and this embodiment will be hereinafter more fully described with reference thereto, and the invention will be finally pointed out in the claims.

In the drawings:

Fig. 1 is a vertical sectional view, taken along the line 1—1 of Fig. 2, and showing the forward end of the automobile engine compartment and hood, and in which is incorporated the latch mechanism according to the exemplary illustrated embodiment of the invention, the same being shown in its normal latching position.

Fig. 2 is a horizontal sectional plan view, taken along the line 2—2 of Fig. 1.

Fig. 3 is a vertical transverse sectional view, taken along the line 3—3 of Fig. 1.

Fig. 4 is a plan view of the forward end of the engine compartment and the latch mechanism carried thereby, the hood being removed.

Fig. 5 is a vertical longitudinal sectional view showing the latch mechanism in its unlatching position and the hood supported thereby in its initially raised position, this illustration being taken along the line indicated by the line 5—5 of Fig. 2.

Fig. 6 is a vertical longitudinal sectional view of the latching parts carried by the engine compartment, the hood being removed, and showing in full lines the position assumed by the latching parts upon raising of the hood, the dot-and-dash lines showing the position to which the latching cam member is moved when engaged by the hood during closing movement.

Similar reference characters indicate corresponding parts throughout the several figures of the drawings.

Referring to the drawings the exemplary embodiment of the invention illustrated therein is adapted for incorporation in an automobile structure in which the hood 10 is hinged at its rearward end to the cowl at the rearward end of the engine compartment; the forward end of the hood adapted in closed position to close against the upper end of the forward or radiator grill end 11 of the engine compartment.

A transverse beam member 12 shaped from a length of angle iron of L-shape in cross-section, which is arched upwardly at its intermediate portion and at its ends is extended rearwardly to provide mounting flanges 13 at each side, is supported within the hood upon angle brackets 14 secured by welding each side of the hood and to which the mounting flanges 13 are secured by rivets 15. Upon the rearwardly facing vertical wall of this beam member there is mounted a centralizing guide and catch keeper member 16 formed from sheet metal bent into inverted U-shape and provided with outwardly bent attaching flanges 17—17 which are rigidly secured to the beam 12 by rivets 18. A cross pin 19 is inserted through apertures in the spaced side walls of the member 16, and extends transversely between the side walls to provide a keeper means for engagement by the latching cam member of the catch mechanism, as will presently more fully appear. At their lower ends the side walls are curved outwardly, as at 20, to provide a diverging entering guide entrance for centralizing the hood with respect to the latch parts as the hood is closed.

A horizontally disposed transverse beam member 21, having a downwardly bent edge flange 22 extending along its longitudinal and end edges, is secured across the engine compartment by means of rivets 23 rigidly connecting the end portions of the beam with the inwardly extended flange bracket portions 24 of the engine compartment. Along the central longitudinal line of the beam 21 there is provided a slot having upwardly extending spaced parallel side walls 25 and a transverse connecting front wall 26, these walls being either integrally formed or welded upon the beam and being slightly less in width than the space between the side walls of the member 16 as a hood centralizing means so that in the latched position they engage within said space, as shown in Figs. 1 and 2.

The cam member, which constitutes the hook, safety catch, guide, and lifting means, is in the form of a cam plate 27 pivotally mounted within the space between the side walls 25 by means of a pivot pin 28, this pin being headed at one end and projecting at its other end and provided upon its projecting end with a coil spring 29, one end of which presses downwardly against the rearward edge of the beam 21, while its other end is provided with a hook 30 engaged with the lower rearwardly projecting edge of the cam plate 27 and exerting upward pressure thereon, and whereby the spring constantly urges the cam plate to rotate in counterclockwise direction.

The cam plate 27 is provided along its upper forward edge portion with a downwardly and forwardly inclined guide surface 31 terminating at it lower forward end in a safety hook portion 32, this safety hook portion being at the forward end of the downwardly and rearwardly inclined latching cam surface 33, which is adapted to engage the cross pin 19 in the latching position, the lower rearward end of this surface 33 terminating in a reversely curved end wall portion 34 extended into a slot forming surface 35 in upwardly and forwardly opposed parallel relation to the rearward portion of the surface 33, the forward end of the surface 35 terminating in the rearward end of an eccentric curved cam surface 36 extended forwardly and downwardly, and so disposed with respect to the axis of the pin 28 that as the cam plate is rotated from the latching position, shown in Fig. 1, in clockwise direction to the unlatched position, shown in Fig. 5, the cam surface 36 gradually rises engaging the cross pin 33 and imparting lifting movement to the hood.

Near the forward lower end of the cam surface 36 there is provided a detent notch 37 which is arranged so that it is engaged by the cross pin 19 at a point beyond the dead center for the purpose of retaining the latching parts in the position shown in Fig. 5, under the weight of the hood and as will hereinafter more fully appear. The lower forward edge surface of the plate 27 is upwardly recessed and provided with a downwardly projecting lug portion 38, which is adapted in the latching position to slot upon the upper end of a helical spring 39 supported between the side walls 25, the side walls each being provided for this purpose with a substantially rectangular shaped opening 40, provided at its upper and lower ends with downwardly and upwardly projecting retaining lugs 41 and 42, respectively, which engage within the upper and lower ends of the spring and thereby retain it in place while permitting it to have a limited compression.

The lower edge of the cam plate 27 between the pivot pin 28 and the spring engaging lug 38 is downwardly projected, as at 43, and has pivotally connected to it, by means of a cross-pin 44, an inverted U-shape bracket member 45 having at its lower end an integrally threaded shank portion 46 to which the upper threaded end 47 of the vertically disposed actuating rod 48 is secured. The bracket 45 is preferably formed from two pieces of sheet metal pressed to shape and welded together, substantially as shown. The sides of the bracket 45 are spaced outwardly from the side surfaces of the cam plate 27, so that they engage upon the outer surfaces of the side walls 25, the beam member being provided at each side of the side walls 25, with a slot 49 through which the side portions of the bracket 45 are adapted to move, and the side walls being provided at each side with a slot 50 concentric to the pivot pin 28 and into which the pin 44 is adapted to move during actuation of the latch.

The lower end of the rod 48 is bent forwardly, as at 51, and is engaged in the aperture 52 in the rearwardly offset end of the actuating lever 53, this lever being rotatably mounted upon a bracket plate 54 secured by rivets 55 to the inner wall 56 of the lower frame structure 57 at the base of the radiator grill, and rigidly connected to the inner end of the shaft 58 of the actuating handle 59, the threaded inner end portion 60 of the shaft having opposed flats 60a whereby it is non-rotatably engaged in a correspondingly shaped passage in the lever 53 and secured by a nut 61. The handle 59 is provided with a bearing flange 62 and has bearing in a flanged bearing opening 63 in the forward wall of the frame structure 57. The bracket plate 54 is provided with a stop lug 64, pressed outwardly therefrom, against which the end portion 65 of the lever 53 engages in the normal latched position, as shown in Figs. 1 to 3, this position being an over center position with respect to the axis of the shaft 58. The relatively long length of the rod 48 permitting it to have a slight flexibility between its ends.

The operation is as follows:

In the latched position, as shown in Figs. 1 to 3, the spring 39 is compressed so that it exerts force upon the cam plate 27 in clockwise direction which draws the rod 48 upwardly thereby retaining the actuating lever 53 in the over center locking position, the cam surface 33 at the same time engaging the cross pin 33 carried by the hood in such manner that any upward force exerted on the hood to raise it will only tend to move the latching parts more firmly to the over center latching position, so that the hood is thus positively retained in latched position. In order to raise the hood the handle 59 and the lever 53 are turned to the dot-and-dash line position shown in Fig. 3. In projecting the rod 48 upwardly and rotating the cam plate 27 in clockwise direction against the force of the spring 29, thus disengaging the latching cam surface 33 from the pin 19 and at the same time engaging the lifting cam surface 36 with the pin 19, the continued turning movement of the cam 27 after it has released the pin 19 from the surface 33 causing the cam surface 36 to initially raise the hood, such raising action being continued until the detent notch 37 comes into engagement with the pin 19, this being at a point over the center of the axis of the pivot pin 28. The weight of the hood is thereupon imposed upon the cam plate in clockwise direction, opposed to the force of the spring 29, and the hood is thus maintained in this initially raised position until it is raised manually to open position.

As soon as the hood is raised manually from the initially raised position as shown in Fig. 5 the pin 19 disengages from the detent notch 37 and the released cam plate is then rotated in counterclockwise direction under the force of the spring 29 to the point where the lug 38 seats upon the upper end of the spring 39, and as shown in full lines in Fig. 6. The force of the spring 29 is insufficient to compress the spring 29 so that the latter merely acts as a stop. In this position the guide surface 31 is disposed in the path of the pin 19 as the hood is closed, the engagement of the pin 19 with the cam surface 31 during the closing movement swinging the cam plate 27 in clockwise direction to the dot-and-dash line position shown in Fig. 6, the pin then passing over the hook end 32 and into engagement with the cam latch surface 33, in which relation the parts are maintained by the pressure exerted on the cam plate 27 in counterclockwise direction by the spring 29. Before actuation of the catch to its normal latching position the spring 29 thus functions to retain the cam plate 27 in safety catch position, and the hood being prevented from accidental opening through contact of the pin 19 with the safety hook portion 32.

In the safety catch position it will be understood that the actuating lever 53 is at a point short of the dead center, this being the position indicated by the dot-and-dash lines B in Fig. 3. The latch is actuated to latching position by rotating the actuating lever 53 from the position B to the over center full line position shown in Fig. 3, drawing the rod 48 downwardly, tightly engaging the latching cam surface 33 with the beam 19 and compressing the spring 39, the compressed spring thereupon exerting upward force on the rod 48 which maintains it in the over center latching position.

I have illustrated and described a preferred and satisfactory embodiment of the invention, but it will be understood that changes may be made therein, within the spirit and scope thereof, as defined in the appended claims.

Having thus described my invention what I claim and desire to secure by Letters Patent is:

1. In a latching mechanism for releasably securing a lid type automobile hood member or the like to an engine compartment member or the like, in which a fixed latching part is carried by one of said members, movable latching means adapted to be carried by the other of said members for cooperation with said fixed latching part, said latching means comprising a support, a latching cam member pivotally mounted on said support for rotation about a horizontal axis, manually operable actuating means connected to said cam latching member adapted to be actuated to move said cam latching member between latching and unlatching positions, said latching cam member including a latching surface adapted to engage said fixing latching part in the latching position, and a safety hook portion at one end of said latching surface adapted to prevent disengagement from said fixed latching part until the latching cam member is manually actuated in unlatching direction.

2. In a latching mechanism for releasably securing a lid type automobile hood member or the like to an engine compartment member or the like, in which a fixed latching part is carried by one of said members, movable latching means adapted to be carried by the other of said members for cooperation with said fixed latching part, said latching means comprising a support, a latching cam member pivotally mounted on said support for rotation about a horizontal axis, manually operable actuating means connected to said cam latching member adapted to be actuated to move said cam latching member between latching and unlatching positions, said latching cam member including a latching surface adapted to engage said fixed latching part in the latching position, a safety hook portion at one end of said latching surface adapted to prevent disengagement from said fixed latching part until the latching cam member is manually actuated in unlatching direction, and a cam surface adapted to engage said fixed latching part during movement to unlatching position to impart lifting movement to the hood.

3. In a latching mechanism for releasably securing a lid type automobile hood member or the like to an engine compartment member or the like, in which a fixed latching part is carried by one of said members, movable latching means adapted to be carried by the other of said members for cooperation with said fixed latching part, said latching means comprising a support, a latching cam member pivotally mounted on said support for rotation about a horizontal axis, manually operable actuating means connected to said cam latching member adapted to be actuated to move said cam latching member between latching and unlatching positions, spring means arranged to exert pressure on said cam latching member to move it toward its latching position, said latching cam member including a latching surface adapted to engage said fixed latching part in the latching position, and a safety hook portion at one end of said latching surface adapted to prevent disengagement from said fixed latching part until the latching cam member is manually actuated to unlatching position.

4. In a latching mechanism for releasably securing a lid type automobile hood member or the like to an engine compartment member or the like, in which a fixed latching part is carried by one of said members, movable latching means adapted to be carried by the other of said members for cooperation with said fixed latching part, said latching means comprising a support, a latching cam member pivotally mounted on said support for rotation about a horizontal axis, manually operable actuating means connected to said cam latching member adapted to be actuated to move said cam latching member between latching and unlatching positions, spring means arranged to exert pressure on said cam latching member to move it toward its latching position, said latching cam member including an inclined guide surface adapted to engage said fixed latching part to move said cam latching member in unlatching direction against the pressure of said spring means during closing of the hood, an inclined latching surface adapted to engage said fixed latching part in the latching position under the pressure of said spring means, and a safety hook portion between said guide and latching surfaces adapted to prevent disengagement from said fixed latching part until the latching cam member is manually actuated in unlatching direction.

5. In a latching mechanism for releasably securing a lid type automobile hood member or the like to an engine compartment member or the like, in which a fixed latching part is carried by one of said members, movable latching means adapted to be carried by the other of said members for cooperation with said fixed latching part, said latching means comprising a support, a latching cam member pivotally mounted on said support for rotation about a horizontal axis, manually operable actuating means connected to said cam latching member adapted to be actuated to move said cam latching member between latching and unlatching positions, spring means arranged to exert pressure on said cam latching member to move it toward its latching position, said latching cam member including an inclined guide surface adapted to engage said fixed latching part to move said cam latching member in unlatching direction against the pressure of said spring means during closing of the hood, an inclined latching surface adapted to engage said fixed latching part in the latching position under the pressure of said spring means, and a safety hook portion between said guide and latching surfaces adapted to prevent disengagement from said fixed latching part until the latching cam member is manually actuated in unlatching direction, a cam surface adapted to engage said fixed latching part during movement to unlatching position to impart lifting movement to the hood.

6. In a latching mechanism for releasably securing a lid type automobile hood member or the like to an engine compartment member or the like, in which a fixed latching part is carried by one of said members, movable latching means adapted to be carried by the other of said members for cooperation with said fixed latching part, said latching means comprising a support, a latching cam member pivotally mounted on said support for rotation about a horizontal axis, manually operable actuating means connected to said cam latching member adapted to be actuated to move said cam latching member between latching and unlatching positions, spring means arranged to exert pressure on said cam latching member to move it toward its latching position, said latching cam member including a latching surface adapted to engage said fixed latching part in the latching position, and a cam surface adapted to engage said fixed latching part during movement to unlatching position to impart latching movement to the hood, detent means on said cam latching member adapted to engage said fixed latching part in the unlatched position under the weight of the hood to restrain return movement of said latching member in unlatching direction.

7. In a latching mechanism for releasably securing a lid type automobile hood member or the like to an engine compartment member or the like, in which a fixed latching part is carried by one of said members, movable latching means adapted to be carried by the other of said members for cooperation with said fixed latching part, said latching means comprising a support, a latching cam member pivotally mounted on said support for rotation about a horizontal axis, manually operable actuating means connected to said cam latching member adapted to be actuated to move said cam latching member between latching and unlatching positions, spring means arranged to exert pressure on said cam latching member to move it toward its latching position, said latching cam member including a latching surface adapted to engage said fixed latching part in the latching position, and a cam surface adapted to engage said fixed latching part during movement to unlatching position to impart latching movement to the hood, detent means on said cam latching member adapted to engage said fixed latching part in the unlatched position under the weight of the hood to restrain return movement of said latching member in unlatching direction, spring means arranged to exert pressure on said cam latching member in unlatching direction, said last mentioned spring means having resistance in excess of the pressure of said first mentioned spring means, said actuating means including a pivoted part movable between full latching and unlatching positions, its pivot axis in the full latching position being at an over center point with respect to the force line of said last mentioned spring means, whereby said last mentioned spring means releasably retains said actuating means in latching position.

8. In a latching mechanism for releasably securing a lid type automobile hood member or the like to an engine compartment member or the like, in which a fixed latching part is carried by one of said members comprising a centralizing bracket member having vertically disposed spaced side walls, and a latching pin extending transversely between said walls, movable latching means adapted to be carried by the other of said members for cooperation with said fixed latching part comprising a support having spaced vertically disposed side walls adapted in the closed position of the hood to enter between said spaced side walls of said centralizing bracket member to centralize the hood, and a latching member movably mounted between said side walls of said support movable between latching and unlatching positions and including a latching surface adapted in the latching position to engage said latching pin.

9. In a latching mechanism for releasably securing a lid type automobile hood member or the like to an engine compartment member or the like, in which a fixed latching part is carried by one of said members comprising a centralizing bracket member having vertically spaced side walls having outwardly flared end portions forming a diverging entrance between said walls, and a latching pin extending transversely between said walls, movable latching means adapted to be carried by the other of said members for cooperation with said fixed latching part comprising a support having spaced vertically disposed side walls adapted in the closed position of the hood to enter between said spaced side walls of said centralizing bracket member to centralize the hood, and a latching member movably mounted between said side walls of said support movable between latching and unlatching positions and including a latching surface adapted in the latching position to engage said latching pin.

10. In a latching mechanism for releasably securing a lid type automobile hood member or the like to an engine compartment member or the like, in which a fixed latching part is carried by one of said members comprising a centralizing bracket member having vertically disposed spaced side walls, and a latching pin extending transversely between said walls, movable latching means adapted to be carried by the other of said members for cooperation with said fixed latching part comprising a support having spaced vertically disposed side walls adapted in the closed position of the hood to enter between said spaced side walls of said centralizing bracket member to centralize the hood, and a latching member movably mounted between said side walls of said supporting member between latching and unlatching positions and including a latching surface adapted in the latching position to engage said latching pin, and a cam surface adapted during movement of said member in unlatching direction to engage said pin to impart lifting movement to the hood.

11. In a latching mechanism for releasably securing a lid type automobile hood member or the like to an engine compartment member or the like, in which a fixed latching part is carried by one of said members comprising a transverse beam adapted to be secured to the side walls of said member, a centralizing bracket member secured to said beam having vertically disposed spaced side walls, and a latching pin extending transversely between said walls, movable latching means adapted to be carried by the other of said members for cooperation with said fixed latching part comprising a transverse support adapted to be secured to the side walls of said member, and a pair of spaced vertically disposed side walls carried by said support adapted in the closed position of the hood to enter between said spaced side walls of said centralizing bracket member to centralize the hood, and a latching member movably mounted between said side walls of said support movable between latching and unlatching positions and including a latching surface adapted in the latching position to engage said latching pin.

ARTHUR CLAUD-MANTLE.